United States Patent [19]

Tajima et al.

[11] Patent Number: 4,964,115
[45] Date of Patent: Oct. 16, 1990

[54] THERMAL SENSING SYSTEM

[75] Inventors: Akio Tajima, Nara; Katsumi Ishii, Sakurai, both of Japan

[73] Assignee: Matsushita Electric Industrial Co., Ltd., Kadoma, Japan

[21] Appl. No.: 472,428

[22] Filed: Jan. 30, 1990

Related U.S. Application Data

[63] Continuation of Ser. No. 132,162, Dec. 11, 1987, abandoned.

[51] Int. Cl.$^5$ ............... G01K 1/16; G01K 3/00; G01K 7/16
[52] U.S. Cl. ............... 374/109; 374/164; 236/44 E
[58] Field of Search ............ 374/164, 185, 208, 121, 374/132, 109; 236/44 E, 91 E

[56] References Cited

U.S. PATENT DOCUMENTS

| | | | |
|---|---|---|---|
| 2,154,927 | 4/1939 | Yaglou | 374/109 |
| 2,835,779 | 5/1958 | Kazan | 236/91 E |
| 2,870,306 | 1/1959 | Ohlheiser | 236/44 E |
| 3,039,025 | 6/1962 | White | 236/44 E |
| 3,062,941 | 11/1962 | White . | |
| 3,630,084 | 12/1971 | McBride, Jr. | 374/109 |
| 3,751,634 | 8/1973 | Madsen . | |
| 4,058,254 | 11/1977 | Hallgreen | 374/109 |
| 4,125,012 | 11/1978 | Madsen | 374/109 |
| 4,164,869 | 8/1979 | Benzinger | 374/121 |
| 4,391,913 | 7/1983 | Keldmann | 374/126 |
| 4,446,913 | 5/1984 | Krocker | 374/109 |
| 4,531,844 | 7/1985 | Juras | 374/208 |

FOREIGN PATENT DOCUMENTS

| | | | |
|---|---|---|---|
| 0248537 | 10/1962 | Australia | 374/109 |
| 466959 | 8/1973 | Australia . | |
| 1921570 | 6/1979 | Fed. Rep. of Germany | 374/132 |
| 3532475 | 3/1987 | Fed. Rep. of Germany | 374/121 |
| 7794 | 6/1960 | Japan . | |
| 0116045 | 9/1980 | Japan | 236/44 E |
| 60-170731 | 9/1985 | Japan . | |
| 61-165547 | 7/1986 | Japan . | |
| 61-81926 | 8/1986 | Japan . | |

| | | | |
|---|---|---|---|
| 8102638 | 9/1981 | PCT Int'l Appl. | 374/109 |

OTHER PUBLICATIONS

MacHattie, "Still-Shade-Temp. Meter for Use in Assessing Personal Cold Stress", Med & Bio. Engineering & Computing, vol. 18, No. 4, Jul. 1980, pp. 474-478.
Patent Abstracts of Japan, vol. 10, No. 15 (P-422) [2072], Jan. 21, 1986; & JP-A-60 170 731 (Matsushita Denki Sangyo K.K.), 04-09-1985.
Patent Abstracts of Japan, vol. 8, No. 72 (P-264) [1509], Apr. 4, 1984; & JP-A-58 218 624 (Matsushita Denki Sangyo K.K.), 19-12-1983.
Thermal Comfort Meter Type 1212, Bruel & Kjaer, Denmark, Jan. 1982.
M. Kobayashi et al.: Development of Thermal Environments Measure, The 10th Symposium on Man-Thermal Environment System, pp. 8-10, Tokyo, Jan. 1982.
S. Inaba: The Measurement of the Distribution of Temperature of the Indoor Air by Moving a Minute Sensor, the 10th Symposium on Man-Thermal Environment System, p. 11, Tokyo, 1986.
S. Kuroiwa et al.: Development of Thermal Environment Controlling Sensor, Industrial Electro-Heat, The Japanese National Committee for Electro-Heat, pp. 59-73, No. 14, Tokyo, 1984.

Primary Examiner—Thomas B. Will
Attorney, Agent, or Firm—Cushman, Darby & Cushman

[57] ABSTRACT

A temperature sensor, e.g. a thermistor (24, 37, 41, 46, 50', 57) is provided in a hollow space in cup-shaped shell (22, 36, 39, 42, 50, 54) of a size, e.g. 30 mm diameter and 15 mm depth, at a position of ⅓ height (i.e. 5 mm) of the depth from the bottom of the shell, the shell having wide opening (23, 33, 43, 47, 55) at its top part, and the temperature sensor is heated by feeding a controlled current to itself or to a heater provided at proximity thereto; the temperature sensor senses environmental condition in the similar manner to human sensation, taking account of air temperature, air flow and radiant heat from nearby matter such as wall or ceiling; thereby enabling comfortable air controlling.

10 Claims, 12 Drawing Sheets

THERMAL SENSING SYSTEM

This is a continuation of application Ser. No. 07/132,162, filed December 11, 1987, which was abandoned upon the filing hereof.

FIELD OF THE INVENTION AND RELATED ART STATEMENT

1. Field of the Invention

The present invention relates to a thermal sensing system for sensing the thermal condition, including effects of radiant heat and air flow, of environments for an air conditioning system, and is for use for providing a comfortable environment for a human being.

2. Description of the Related Art

Air conditioning system to provide comfortable indoor environments for human beings conventionally has been controlled mostly based on results of measurement of only environmental air temperature by a temperature sensor, such as principally, a thermistor. In such a conventional system, since the air temperature is directly detected and the controlling is made based on this air temperature, it has not been possible to reflect human sensations concerning air flow and radiation temperature, which are also fundamental items for human sensation besides the air temperature for human sensation of comfortability. Accordingly, even though the air temperature is maintained constant, the temperature sensation to be felt by the human body differs depending on various environmental conditions, and therefore the controlling becomes sometimes too hot or too cold and the user must change the temperature setting time by time even though a thermostat is used.

Accordingly, as civilized standard of life becomes higher, a more improved controlling apparatus to respond to human sensation for a person to live in an air conditioned space has been strongly demanded.

Human body retains its body temperature substantially constant in order to keep its life activity good. That is it produces heat by metabolism in the body, and on the other hand makes thermal exchange with environment principally by convection, radiation and evaporation, thereby to keep the temperature of deep inside part of the body constant. For a instance, generation of cool feeling at receiving wind is induced by heat loss through convection, and producing of warm feeling under strong sunshine from clear sky, even under moderate environmental temperature, is caused by reception of solar radiation by the human body. Besides, the body temperature adjustment is made by controlling of blood flow, sweating under hot condition and shivering at a cold condition. The thermal sensation of human body becomes worse as extent of temperature adjustment required for the human body increases, such as by increased controlling of blood flow, sweating and shivering. And it is confirmed that the human thermal sensation has a correlation with human skin temperature, which is junction point between the human body and the environment. Accordingly, if there is provided a thermal sensing system which produces a heat analogous to the human skin and at the same time senses the environmental condition, the thermal sensation of the human body can be simulated thereby.

Average condition of convection heat transfer of the whole human body (influence by air flow) can be considered to be substantially equivalent to and be simulated by a transducer of a size of cylinder of about 15 cm diameter or a sphere of about 15 cm diameter. Therefore, by heating such transducer to a temperature which is substantially equal to that of the human body and by measuring its surface temperature, a good simulation system of thermal sensing can be realized. In such way, various trials have been made. One conventional example disclosed in Japanese examined published patent application sho No. 35-7794 is shown in FIG. 1. In the conventional example of FIG. 1, the thermal sensing system 1 consists of a thermal sensing unit 2 and a control unit 3. The thermal sensing unit 2 comprises an outer shell 4 of about a size of human head skull and a temperature sensor 7 disposed therein and consisting of an electric resistor 5 as a heater connected through feed wires 8 to the control unit 3 and a temperature sensor 6 such as thermistor. The control unit 3 comprises controlling means 9 which is a constant voltage circuit for feeding power corresponding to heat loss amount of the human body through power feed wires 8 connected to the heater 5, and comprises a judgement unit 12. The judgement unit 12 detects internal temperature change of the transducer 7 determined by environmental temperature and cooling effect influenced by air flow and radiant heat on the thermal sensing unit 2 through signal wires 10, thereby to produce a control signal to the air conditioner 11 based on the difference from a preset reference value. In such a thermal sensing system 2, though it is possible to output equivalent output to human thermal sensation, location or disposing thereof is limited due to its large size, and besides its power consumption is considerably large, such as 10W because it requires heat to warm large outer shell 4, and further its response time is as slow as 10–15 minutes because of its size. And accordingly such system has difficulty in practical usage for a thermal sensing system for application to a controlling system of an air conditioner.

When it is intended to reduce size of the thermal sensing unit, it is likely that rate of heat transfer by convection becomes larger than the case of human body. Thus, the second prior art wherein the convection heat transfer is reduced in the thermal sensing unit was proposed as shown in Japanese unexamined published patent application sho No. 60-170731. In the conventional example of FIG. 2, a heater 13 has a coating 14 of a jelly type material which makes temperature conductivity agree to that of human skin, and the jellied coating 14 therein has a temperature sensor 15, which is a thermocouple for sensing temperature, thereby to constitute a temperature sensor 16. Furthermore, on the outer side of the temperature sensor 16, there is provided a cover 18 which is molded by transparent polyethylene resin or the like resin which can pass heat radiation and has a number of vents 17. In the above-mentioned constitution, since the cover 18 attenuates only convection heat transfer, not attenuating the radiation heat transfer, and hence equivalent output to the human thermal sensation is obtainable. However, in order to prevent radiation heat transfer by the cover 18, it must be very thin such as of microns thickness, and there is a shortcoming that if the cover 18 is made thick in order to strengthen its structure, the radiation heat transfer unexpectedly attenuates, thereby attenuating feeling to produce equivalent radiation characteristic to the human skin. Furthermore, since a special jellied material is used as the coating 14, its configuration becomes complicated, and response characteristic becomes worse.

OBJECT AND SUMMARY OF THE INVENTION

In order to solve the above-mentioned problems of the prior arts, the present invention proposes an improved thermal sensing system capable of having equivalent sensation to convection, radiation and evaporation to that of human skin even by its small size. The improvement is made by adoption of special configuration to reduce flow rate of air to reduce convection heat transfer and by converging radiant heat to increase amount of radiant heat input to the transducer.

The thermal sensing system in accordance with the present invention comprises a shell having a hollow space which has a single opening on one side and an inside face of good reflectivity for light and heat, a transducer which is disposed in the hollow space, changes electric resistance as temperature changes and makes heat by being fed electric power thereto, control means for retaining the transducer at a predetermined temperature by controlling said electric power, and judgement means for judging environmental thermal condition basing on electric power fed to the transducer from the control means.

According to the above-mentioned constitution of the thermal sensing system, the system can control the air conditioning system with good response and with moderate power by using control signal suitable for microprocessor controlling. And therefore, in comparison with the conventional controlling of the air conditioning system using only air temperature sensing, more improved controlling which is agreeable to human sensation to enable comfortable environment is obtainable, through more rapid warm up or cool down of the space to be air conditioned, taking account of corrections for radiation of sun light, influence of air flow and evaporation, by using only small sized sensor unit.

The transducer carries out exchange of radiant heat in the inside space of the shell through the opening with the ambient matters and sun shine, and besides it makes convective heat exchange with secondary flow in the inside space of the shell induced by the ambient flow. Since the shape and size of the shell is designed so that ratios among the convective heat transfer and radiant heat transfer by the transducer and ambient atmosphere is substantially identical to the case of the human body, an amount of load for retaining the transducer at a preset temperature by the controlling means corresponds to a load for retaining human body temperature at a constant value. Therefore, by taking out an electric signal corresponding to the former load, the thermal sensation of the human body can be judged through the output; and by controlling the air conditioning system basing on the output, making a comfortable air-conditioned space is easily obtainable.

Furthermore, by making the transducer or thermal sensor in a small type simple configuration, response time to changes of plural physical amounts in the environment such as air temperature, air flow and radiation temperature, can be made so quick as within about 15 seconds, which is far shorter in comparison with the conventional response time of about 15 minutes. Thereby, comfortable control of air conditioning system can be made by quick responding to the atmospheric change, besides the responses to plural physical amounts.

Furthermore, since the transducer can be designed to operate with very small wattage of power such as 3 mW, contrasted to 10W of the conventional temperature sensing unit, the transducer can be operated by dry battery. Accordingly, the transducer or temperature sensor can be enclosed in a remote control unit which is to be used near human body, or the like actual positions which are object of the control, and thereby atmospheric temperature sensing in actual situation becomes easy and ideal.

Still furthermore, the temperature sensing system in accordance with the present invention issues output in electric power changes which is easily usable as control signal for air conditioning system, and therefore, the sensing system has very wide utility as the thermal sensing system for the air conditioning system.

DESCRIPTION OF THE PREFERRED EMBODIMENTS

Figure 1:
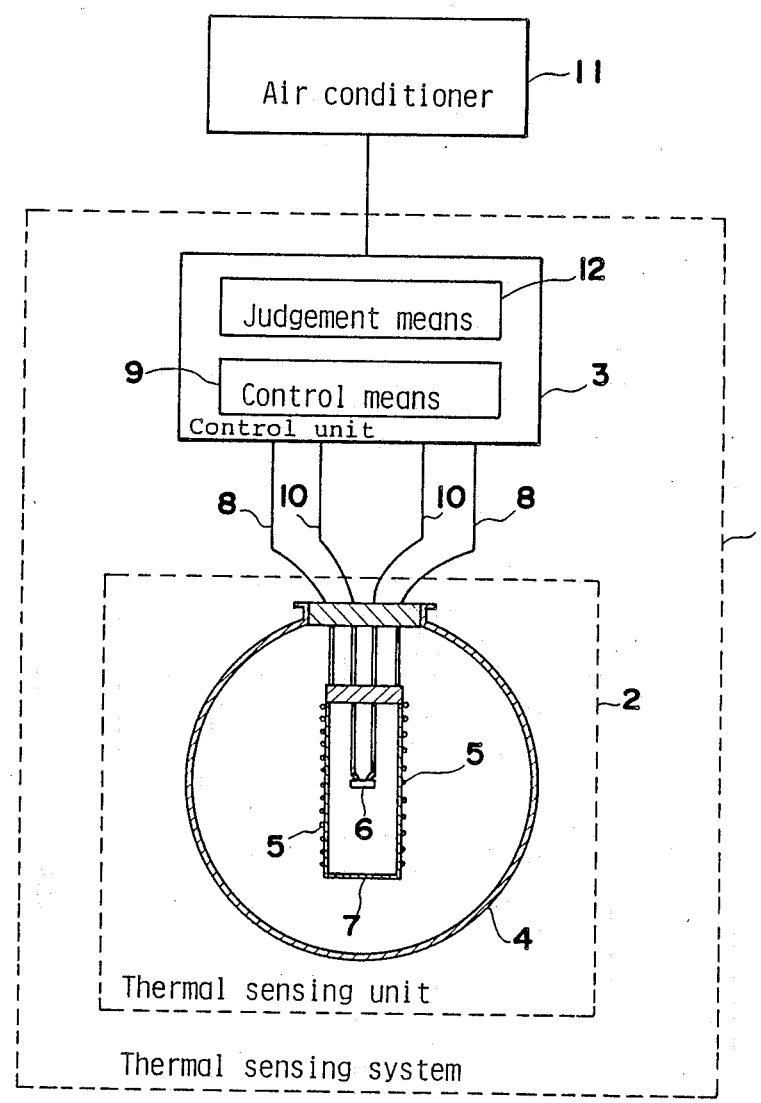
FIG. 1 is the block diagram of the first conventional example of thermal sensing system.
Figure 2:
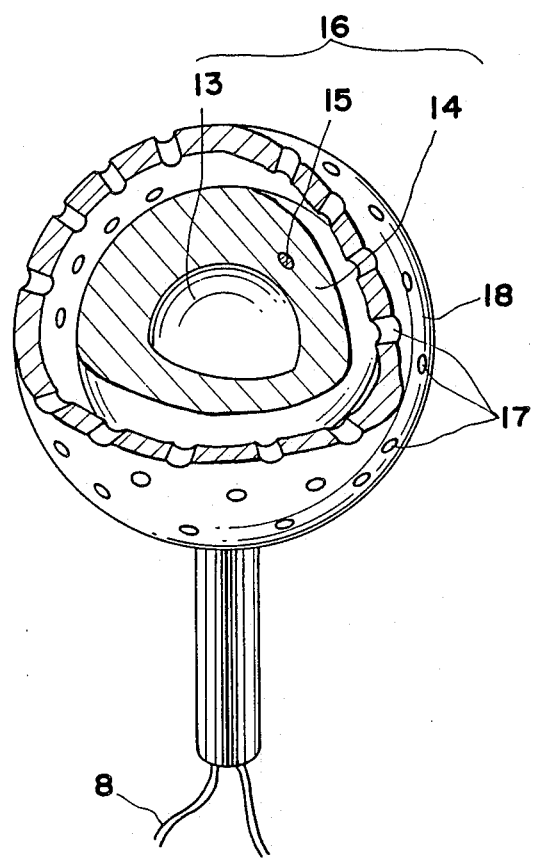
FIG. 2 is the perspective view showing the second conventional thermal sensing system with one part broken out.
Figure 3:
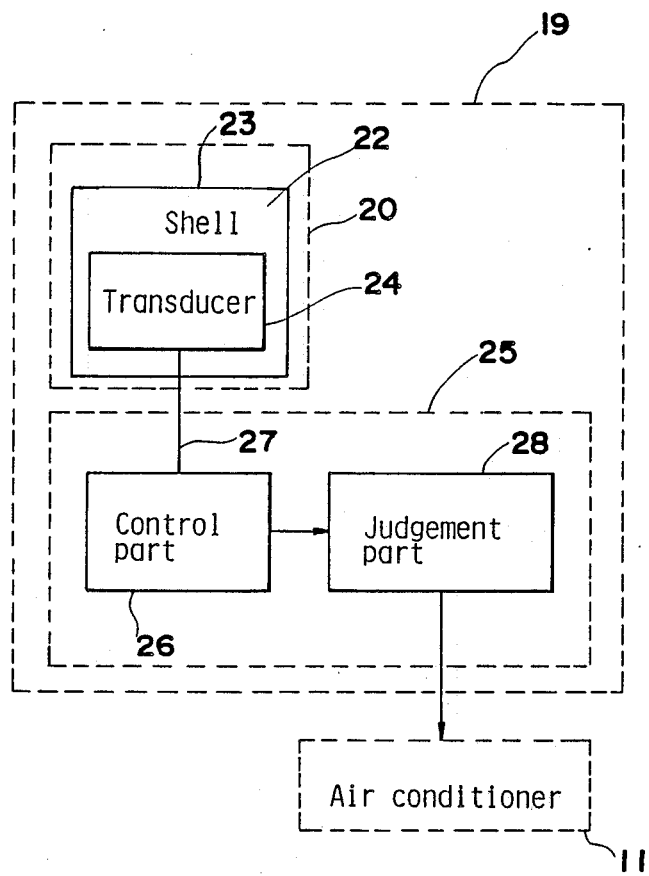
FIG. 3 is a circuit block diagram of the thermal sensing system embodying the present invention.
Figure 4:
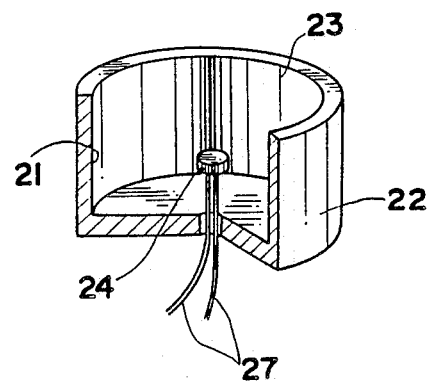
FIG. 4 is a partially cutout perspective view showing a thermal sensing unit of a first example.

FIG. 3 shows the whole circuit block diagram of the thermal sensing system 19 in accordance with the present invention and an air conditioner 11 which is to be controlled by the thermal sensing system 19. As shown in FIG. 3, the thermal sensing system comprises a thermal sensing unit 20, configuration of which is shown in FIG. 4, and a control unit which is an electronic circuit or a microprocessor and outputs signals to control the air conditioner 11. The control unit 25 comprises a control part 26 and judgement part 28. The control part 26 controls, through electric wires 27, a transducer 24, e.g. a thermistor or a combination of a very small heater and a temperature sensing device and further gives signal to the judgement part 28. The judgement means judges the signal from the control part 26 and issues appropriate control signal to the air conditioner 11.

As shown in FIG. 4 which is a partially cut out perspective view of the thermal sensing unit 20, the thermal sensing unit 20 comprises a shell 22 of a cup-shape or a cylindrical shape having a wide opening 23 at its top part. The size of the cylindrical shape shell is, for instance of about 30 mm diameter and about 15 mm height and has inside face made of good reflective material such as aluminum to light and radiant heat. And substantially on the axis of the shell 22 and at the height of about 1/3 from the inside bottom of the shell, a small sized transducer 24, such as a thermistor is provided. The transducer 24 has a function to be heated by receiving a control current from the control part 26 of the control unit 25, and also changes its electric resistance depending on its temperature, to give an electric signal to represent the temperature, for instance as voltage across its both ends. The transducer 24 is controlled to have a temperature substantially equivalent to that of human body skin. Therefore, by receiving the signal of temperature from the transducer 24, the judgement part 28 issues a control signal for the air conditioner 11. The control signal corresponds to state of control load of the control part 26, such as voltage across two lead wires 27, or current therethrough, taking account of human temperature sensation characteristic.

Figure 5:
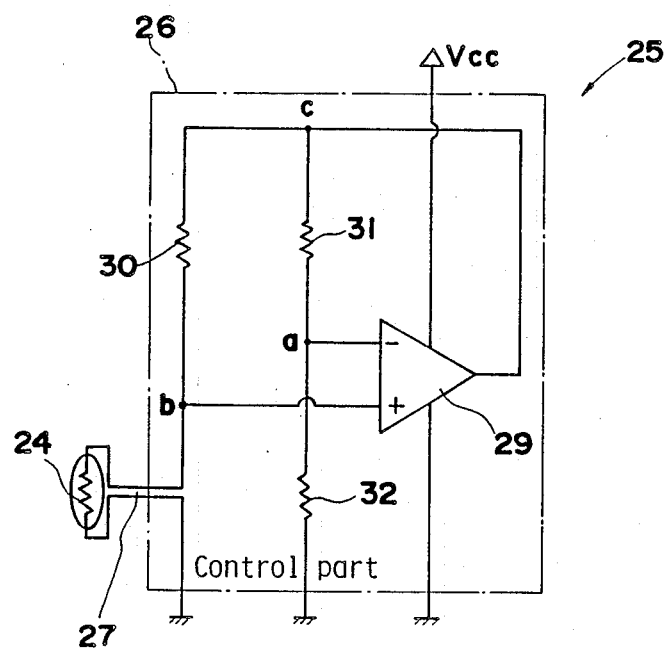
FIG. 5 is a circuit diagram of one example of a circuit of control part for the thermal sensing system.
Figure 6:
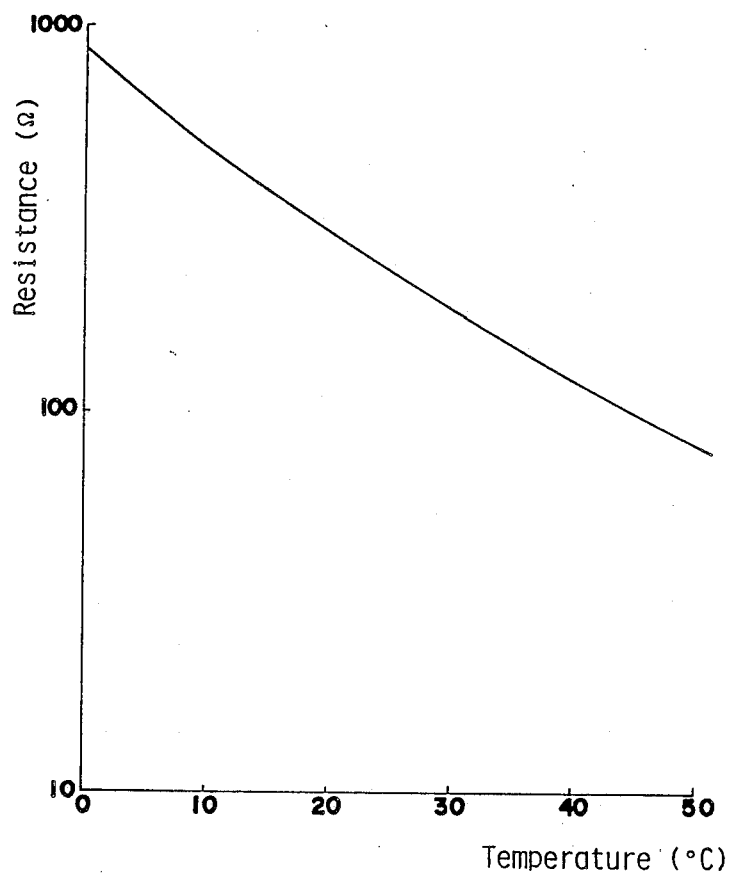
FIG. 6 is a graph showing temperature-resistance characteristic of a thermistor used as a transducer of the first embodiment.

FIG. 5 shows a circuit diagram of one example of the control unit 25, which comprises a thermistor as the transducer 24 and the control part 26 and lead wires 27 connecting therebetween. The control circuit comprises an operational amplifier 29 and resistors 30, 31 and 32 which together with the thermistor 24 constitute a temperature responding circuit. The transducer (i.e., thermistor) 24 has a known temperature-resistance characteristic shown in FIG. 6. When the circuit is operated by application of a power through the power source terminal Vcc, the transducer 24 is electrified in a manner to make a predetermined resistance corresponding to a predetermined temperature, which makes an equilibrium state of the operational amplifier circuit. That is, for instance, when any one item of environmental conditions, i.e., air temperature, air flow or radiant temperature changes thereby to lower the temperature of the transducer 24, the resistance of the transducer 24, which is the thermistor, increases. Thereby the potential of the point "b" rises. Therefore, the operational amplifier 29 amplifies temperature difference between the point "a" and the point "b" of FIG. 5, and hence, the potential of the point "c" rises. And therefore, current flowing in the transducer 24 increases; and the increase of current increases heat generation of the transducer 24 and raises the temperature thereof. Then, the temperature of the transducer 24 reaches the equilibrium temperature determined by the circuit design. At that operation, the heat balance of the transducer surface and its environment is given by the following equation $$Q = \alpha c(T_s - T_a) + \alpha r(T_s - T_r) \qquad (1),$$

wherein

Q: heat discharge (load for controlling the temperature of the transducer 24 at a constant temperature) per unit surface area of the transducer 24,
$\alpha c$: convection heat transmittance,
$T_s$: temperature of the transducer 24 (controlled at a constant temperature),
$T_a$: atmospheric temperature,
$\alpha r$: radiant heat transmittance between the transducer 24 and environment,
$T_r$: environmental radiant temperature.

Figure 7:
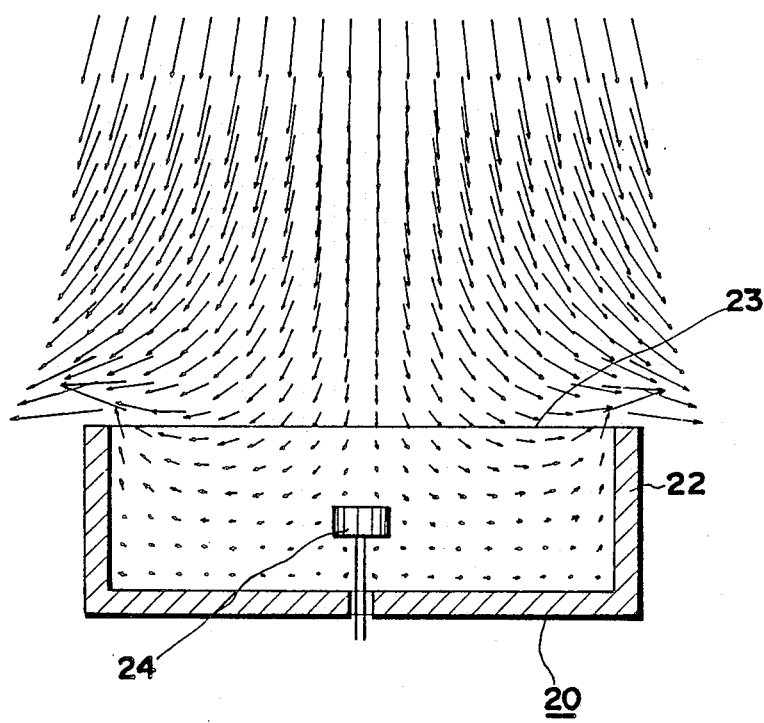
FIG. 7 is a computer-drawn air flow diagram on a sectional view along the axis of the thermal sensing unit, for showing air flow around the unit.

Since the transducer 24 is disposed in the hollow space of the shell on its axis at a height of about 1/3 of the depth from the bottom of the hollow space, the transducer 24 does not make full convection heat exchange directly with the ambient air flow around the thermal sensing unit 20. But the transducer 24 makes heat exchange by secondary air flow in the hollow space in the shell, which is induced by external air flow outside the shell and has very much reduced flow velocity. FIG. 7 is a computer-drawn sectional view showing air flows inside and outside of the shell 22, wherein air flow directions are shown by small arrows and flow velocities are shown by length of the arrows.

Since the inside face 21 of the shell 22 is made by material of good reflectivity to light and heat such as aluminum polished face, the transducer 24 makes heat exchange directly with surrounding matters, sun light and radiation heat, and besides makes heat exchange with indirect light and radiation which are reflected by the inside face 21. Thus very efficient heat exchange is obtainable.

Owing to the above-mentioned configuration, radiation heat transmittance $\alpha r$ of the transducer 24 and convection heat transmittance $\alpha c$ of the same become substantially equal to the radiation heat transmittance and average convection heat transmittance of human body, respectively. And therefore, a high correlation between (1) simulated heat load to maintain the transducer 24 at a predetermined temperature, which is intended to correspond to actual human skin body temperature, and (2) actual heat load to maintain body temperature of the human body under the same ambient condition is obtainable.

Figure 8:
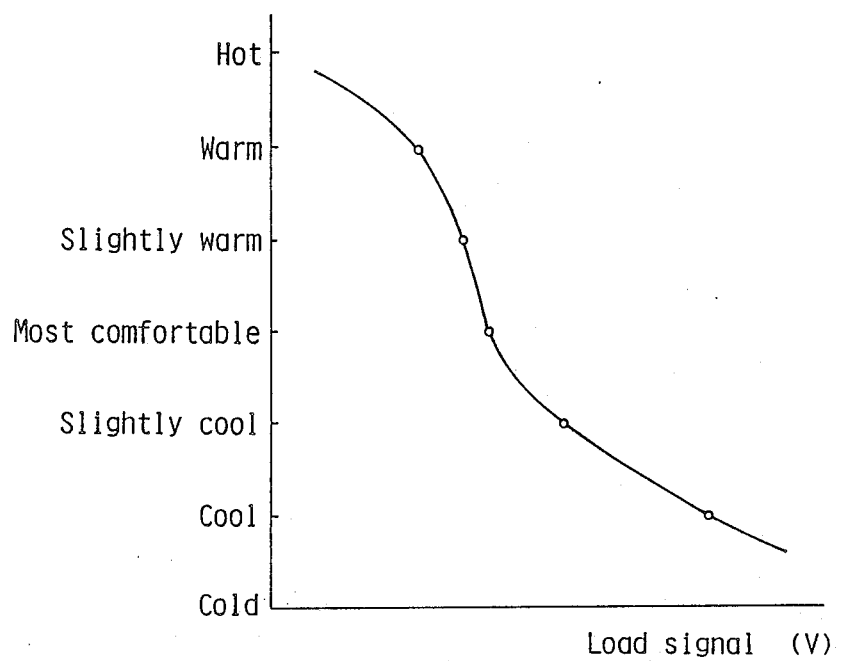
FIG. 8 is a graph showing a relation of human sensation and output signal (load output of the controlling means) of the embodiment.

FIG. 8 shows relation between load signal which is taken out as voltage changes at the point "b" or point "c" in the circuit of FIG. 5 and human thermal sensation. The judgement means 28 comprises one-chip microprocessor. In the judgement means 28, a ROM preliminarily stores a correction table for correcting non-linearity of the thermistor as the transducer 24 to linear relation and relation of FIG. 8 of human temperature sensation Vs, load signal to be obtained by the control part 26. Such storing in the ROM is in the shape of numerical table or numerical equation. Accordingly, the judgement means can issue the output which is substantially equivalent to human thermal sensation to be made by air temperature, air flow and radiation heat in that ambient condition, basing on electric signal from the transducer 24. Therefore, by controlling the air conditioner so as to produce an equilibriumed, by utilizing the output of the judgement part 28 most comfortable environment which takes account of air temperature, air flow and radiant heat is obtainable.

Figure 9:
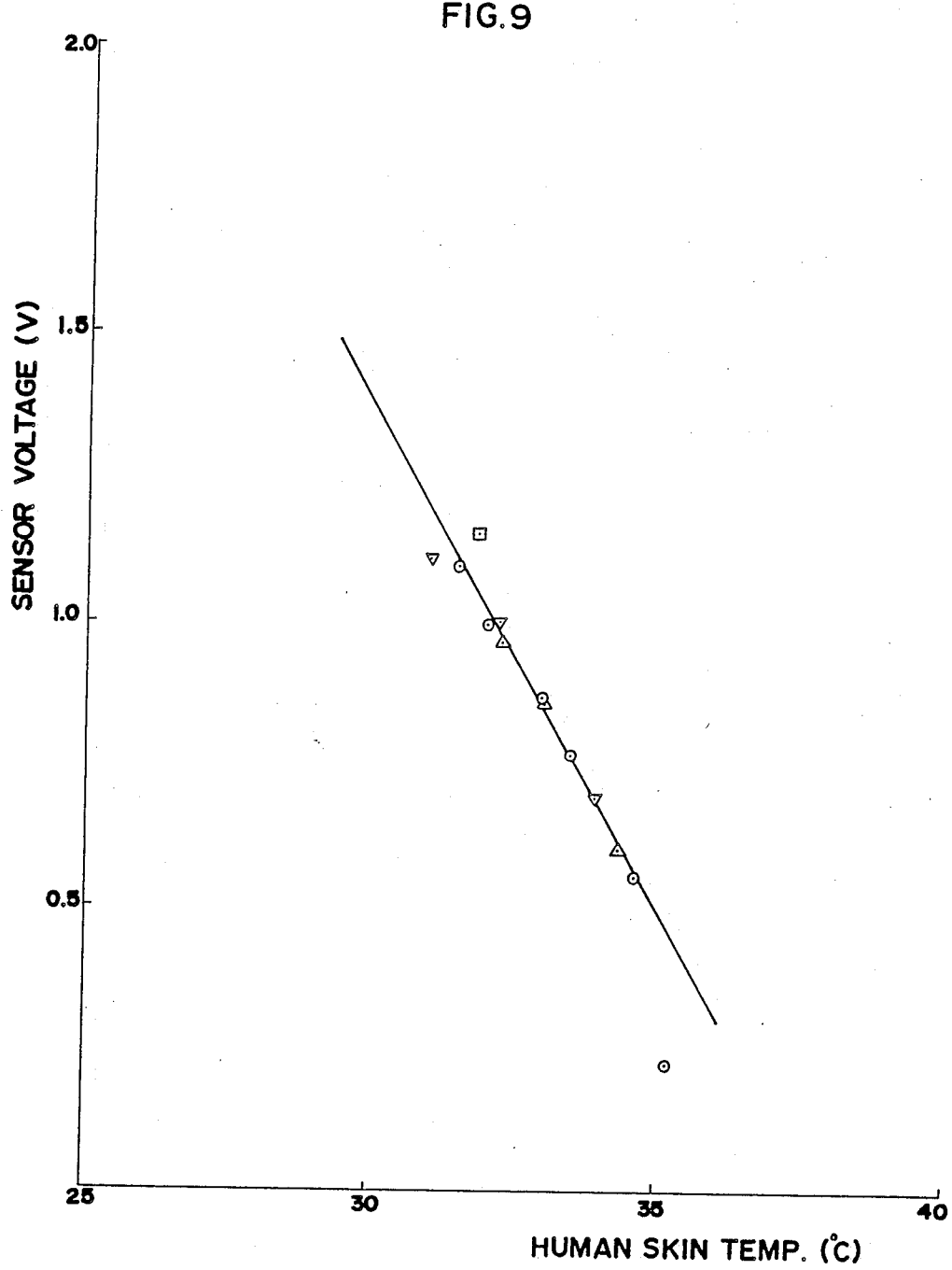
FIG. 9 is a graph showing characteristic curve of output (sensor voltage) and human skin temperature.
Figure 10:
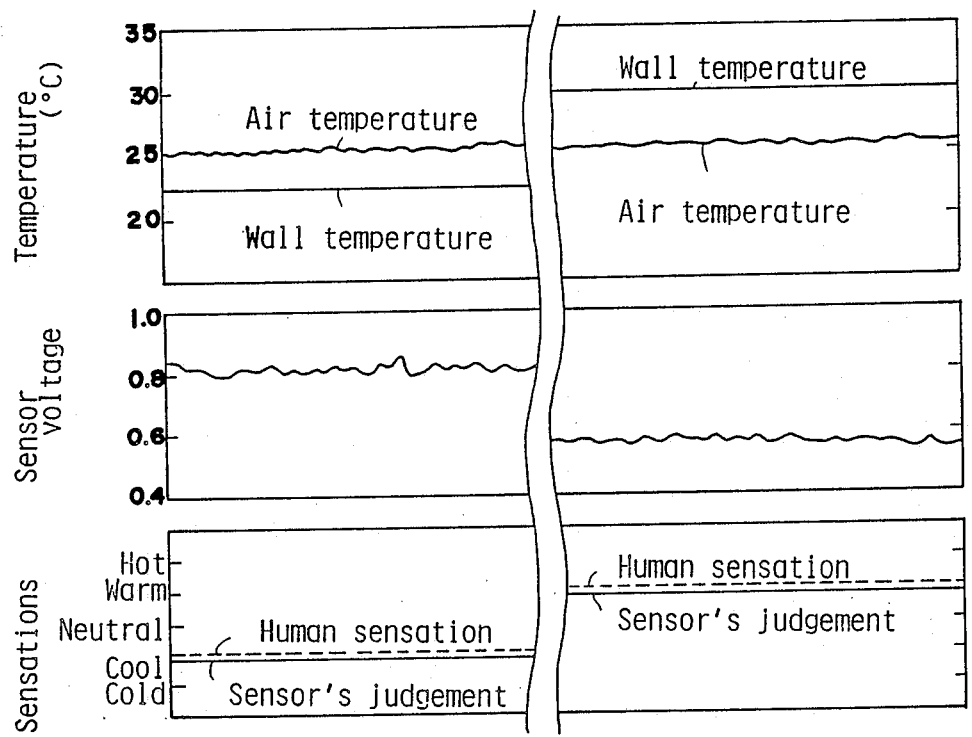
FIG. 10 is a characteristic diagram showing characteristics for radiation heat.

Characteristic of the thermal sensing system 19 of the present invention with respect to air temperature and air flow is shown in FIG. 9. FIG. 9 shows comparison of outputs of the thermal sensing system 19 under various conditions of air temperature, air flow and number of garments put on with human skin temperature at the same condition. This experimental plotting shows that correlation of sensitivity between sensitivities for air temperature and air flow of the thermal sensing system of FIG. 9 with the human body exists. FIG. 10 shows characteristic of the radiation of the thermal sensing system 19. FIG. 10 shows measured curves of outputs of the thermal sensing system 19 for the cases, where wall temperatures are higher than (right hand curves) and lower than (left hand curves) a fixed temperature of air and feelings stated by test people in the room. The graph of FIG. 10 proves that, even under a constant air temperature, the human sensation of temperature varies depending on difference of wall temperatures, namely the radiant temperature from the wall, and that the output of the thermal sensing system in accordance with the present invention agrees with human sensation of temperature.

In the above-mentioned examples, wherein the transducer 24 is a thermistor, a transducer consisting of known platinum resistor as temperature measurement element can be used similarly.

Figure 11:
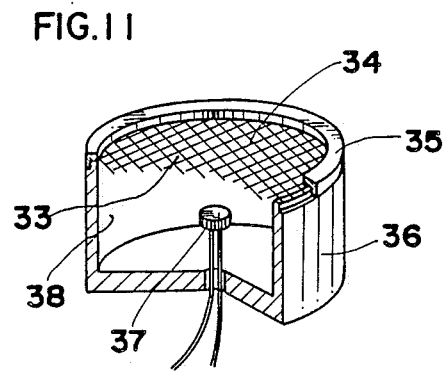
FIG. 11 is a partially cutout perspective view of another embodiment of the thermal sensing unit.

FIG. 11 shows another embodiment of thermal sensing unit. In this example, the opening 33 is covered by a porous cover 34, surface of which is non-reflective against light and heat. For instance a porous cover 34 of about 60% aperture ratio made of stainless steel net, surface whereof is coated by non-reflective or lusterless black surface paint, is fixed to the opening 33 by a fixing ring 35 fitted to the opening 33 of the shell 36. By such configuration, an expected damaging of the transducer 37 or inside face (reflective face) 38 of the thermal sensing unit by finger or pencil or the like is prevented. The porous cover 34 may be made of any suitable metal or plastic material.

Figure 12:
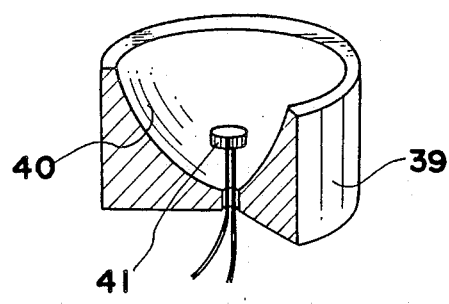
FIG. 12 is a partially cutout perspective view of still other embodiment of the thermal sensing unit.

FIG. 12 shows another embodiment of the thermal sensing unit. In this example, the inside reflective face 40 of the shell 39 is configured as paraboloid of revolution and the transducer 41 is positioned substantially at the focal point of the paraboloid of revolution of the inside reflective face 40. According to such configuration, the thermal sensing unit is given of directivity against radiation, and therefore it is possible to detect influence of radiation of wall to be measured is possible. Besides, by such configuration wherein sensitivity raised by converging the directivity for the radiation, the shape and size of the transducer 41, hence the sensing unit per se, can be made smaller, thereby enabling operation by smaller power. The shell 39 can be made by plastic mold with aluminum reflective coating of, for instance, vacuum deposited aluminum film. The curved surface of the inside face may be, besides the simple paraboloid of revolution, other curved faces such as composite paraboloid of revolution.

Figure 13:
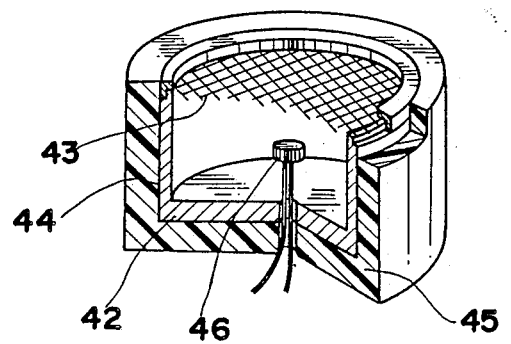
FIG. 13 is a partially cutout perspective view of still other embodiment of the thermal sensing unit.

FIG. 13 shows still other embodiment wherein heat insulative material 45 is provided on outside face 44 of the shell 42. For example, by forming a foamed urethane heat insulator 45 of about 5 mm thickness on outside face 44 of the shell 42, undesirable heat transmission from outside face of the shell 42 is prevented, and response of the transducer 46 becomes more quick.

Figure 14:
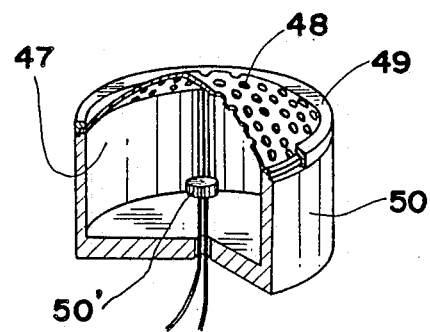
FIG. 14 is a partially cutout perspective view of still other embodiment of the thermal sensing unit.

FIG. 14 shows still other embodiment wherein at the opening 47 of the shell 50, a porous cover 48 having a convex or hemispherical shape and made of stainless steel sheet is provided by a fitting ring 49. The porous cover has about 60% aspect ratio. By providing the porous cover 48 in convex or hemispherical face shape, it is possible to receive radiation, which is almost parallel to the face of the opening 47; and besides, influence of air flow can be sensed by the transducer 50' without severe influence of direction of the air flow. Furthermore, by making the porous cover 48 in hemispherical or convex shape, the cover 48 becomes strong, so that damage by unexpected touch or collision is reduced.

Figure 15:
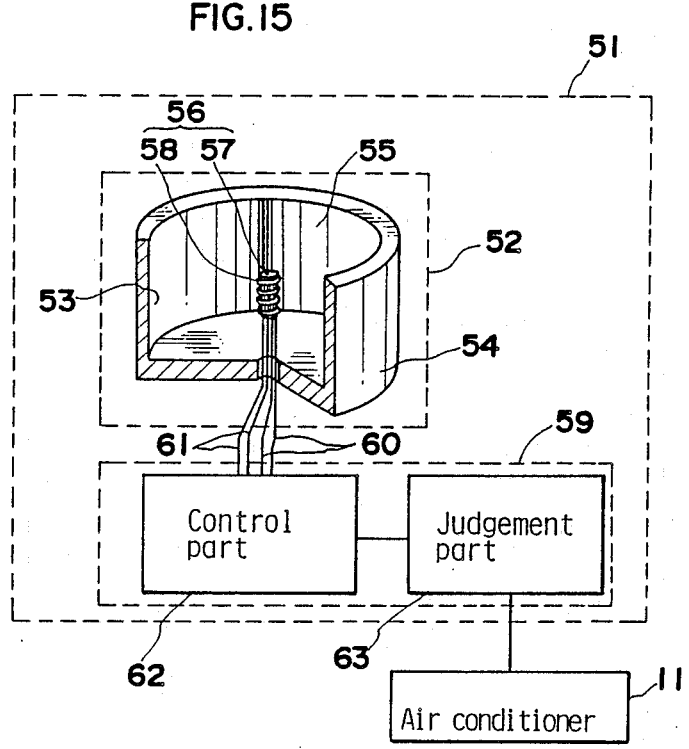
FIG. 15 is a block diagram with a partially cutout perspective view of still other embodiment of the present invention.
Figure 16:
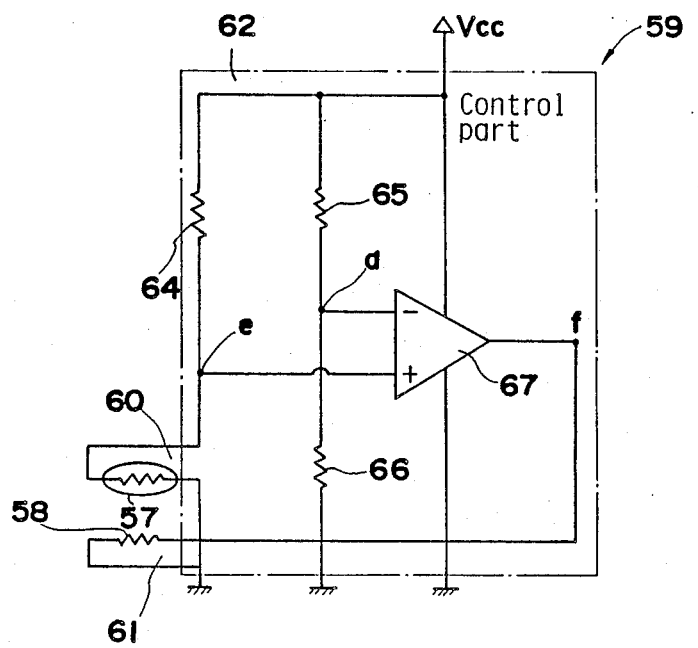
FIG. 16 is a circuit diagram of controlling part of the embodiment shown in FIG. 15.

FIG. 15 and FIG. 16 show still another embodiment. As shown in FIG. 15, the thermal sensing unit 52 comprises a cylindrical shell 54 having a hollow space inside and a wide opening 55 on the top part and made of good reflective material, such as aluminum and of a size of about 30 mm diameter×about 15 mm height, and a transducer 56 provided around on the axis of the shell 54 at a height of about 1/3 from the bottom to the opening edge of the shell 54. The transducer 56 comprises a thermistor 57 as temperature sensor at the center and a nickel-chrome wire 58 as a heater wound around the temperature sensor 57 in a manner insulated therefrom. A control unit 59 comprises a control part 62 and a judging part 63. The control part 62 receives change of temperature inside the transducer 56 determined by the cooling effect of environmental air temperature, air flow and radiant temperature to the sensing unit 52, through output signal wires 60, and feeds electric power through power feed wires 61 to the heater 58 responding to temperature difference from a preset temperature of substantially the human skin temperature. The judgement part 63 receives signal from the control part 62 and issues output signal for controlling an air conditioner 11, basing on judgement made therein taking account of feature of human thermal sensation.

FIG. 16 is a circuit diagram of one embodiment of the control unit 59, wherein the temperature sensor (thermistor) 57 and resistors 64, 65 and 66 together constitute a bridge circuit. The heater 58 is fed with the electric power controlled by an operational amplifier 67, in a manner that the bridge is equilibrated. That is, for instance, when any one item of environmental conditions, i.e., air temperature, air flow or radiant temperature changes thereby to lower the temperature of the thermistor 57, the resistance of the thermistor 57 increases. Thereby the potential of the point "e" rises. Therefore, the operational amplifier 67 amplifies temperature difference between the point "d" and the point "e" of FIG. 15, and hence, the potential of the point "f" rises. And therefore, current flowing in the heater 58 increases; and the increase of the current increase heat generation of the heater 58 and raises the temperature of the thermistor 57. Thus the temperature of the thermistor 57 reaches the equilibrium temperature determined by the circuit design. In this operation, as the temperature sensor 57, a thermistor of a large resistance is preferable. By receiving the output signal from the control part 62, the judgement part 63 sends control signal to the air conditioner 11, so that the air conditioner is controlled to keep the temperature of the space of object at a comfortable state which is judged by the judgement part 63 taking account of the feature of the human thermal sensation to the air temperature, air flow and radiant temperature.

By providing a porous cover of non reflective surface against light and heat on the opening 55 of the thermal sensing unit 52, by forming the cover in outside convex shape, by forming the inside reflective face of the shell in a paraboloid of revolution wherein the transducer is situated at its focus point or/and by providing heat insulator on outside face of the shell except the opening part, the characteristics of the thermal sensing system of this embodiment is greatly improved, like the preceding embodiments.

As has been described on several embodiments, according to the present invention, very much improved thermal sensing system can be provided, which can satisfactorily control any air conditioning apparatuses, not limited to air cooler, but including room warmer, furnace, stove, etc., by measuring the whole environmental temperature conditions including air temperature, air flow and radiant heat which are effective to the human body as a whole. Furthermore, since the system of the present invention is of compact size and small power consumption, the system can be contained in a battery-operated handy remote controller unit which an easily and accurately senses thermal environmental state, and is useful not only in home, but also in office or shops.

What is claimed is:

1. A thermal sensing system for sensing thermal conditions of an environment as a human body would sense said conditions, comprising:
    a shell, having an inside face which has good reflectivity for light and heat and a hollow interior space inside said inside face, said shell having an opening into said hollow space, said opening directly exposing the inside of said shell to the environment;
    a thermistor assembly which is disposed in said hollow space at a position such that it receives a secondary airflow in the hollow space, induced by but lower than an external airflow of said environment as a human body would receive said airflow and also receives radiant heating effects from said environment, said position such that it receives radiant heating as a human body would, and which changes its electric resistance proportional to temperature changes, and for generating heat by being fed electric power thereto;
    control means for controlling a temperature of said thermistor assembly to be a predetermined temperature, by controlling said electric power; and
    judgement means for determining said environmental thermal conditions based on said electric power fed to said thermistor assembly from said control means, to issue an output signal indicative of said environmental thermal conditions.

2. A thermal sensing system in accordance with claim 1 further comprising a heat insulator outside of said inside surface of said shell except at the opening.

3. A thermal sensing system in accordance with claim 1
    further comprising a porous cover covering said opening but still directly exposing said inside to said environment, which has an externally convex shape.

4. A system as in claim 1 wherein said inside face is shaped into a paraboloid, and said thermistor assembly is disposed substantially at a focal point of said paraboloid.

5. A thermal sensing system for sensing thermal conditions of an environment as a human body would sense said conditions, comprising:
    a shell having an interior hollow space defined by an inside face of good reflectivity for light and heat and a hollow interior space inside said inside face, said shell having an opening into said hollow space said opening directly exposing the inside of said shell to the environment;
    a thermistor assembly which is disposed in said hollow space at a position such that it receives a secondary airflow in the hollow space, induced by but lower than an external airflow of said environment as a human body would receive said airflow and also receives radiant heating effects from said environment, said position such that it receives radiant heating as a human body would, and which changes its electric resistance as a temperature changes;
    a heater for heating said thermistor assembly in response to electric power being fed thereto;
    control means, monitoring said thermistor assembly, for controlling a temperature of said thermistor assembly to be a predetermined temperature by adjusting an amount of said electric power to said heater; and
    judgement means for judging said environmental thermal conditions based on said amount of said electric power fed to said heater from said control means, to issue an output signal indicative thereof.

6. A thermal sensing system in accordance with claim 5 further comprising a heat insulator on said shell except at the opening.

7. A thermal sensing system in accordance with claim 5
    further comprising a porous cover which has an externally convex shape.

8. A thermal sensing system in accordance with claim 5 wherein
    said heater is provided in a proximity of said thermistor assembly.

9. A thermal sensing system in accordance with claim 8 wherein
    said heater is wound around said thermistor assembly in an insulated manner therefrom.

10. A system as in claim 5 wherein said shell has an inside face which is shaped into a paraboloid, and said thermistor assembly is disposed substantially at a focal point of said paraboloid.

* * * * *